Aug. 22, 1950   S. A. POMERANCE   2,520,055
AIRPLANE HANGAR
Filed Oct. 14, 1946   5 Sheets-Sheet 1

Inventor
SAMUEL A. POMERANCE
By
C. L. Parker Attorney

Aug. 22, 1950     S. A. POMERANCE     2,520,055
AIRPLANE HANGAR

Filed Oct. 14, 1946     5 Sheets-Sheet 3

Inventor
SAMUEL A. POMERANCE

Aug. 22, 1950  S. A. POMERANCE  2,520,055
AIRPLANE HANGAR
Filed Oct. 14, 1946  5 Sheets-Sheet 4

Inventor
SAMUEL A POMERANCE
By C. L. Parker
Attorney

Patented Aug. 22, 1950

2,520,055

UNITED STATES PATENT OFFICE 2,520,055

AIRPLANE HANGAR

Samuel A. Pomerance, Hempstead, N. Y.; Elsie Pomerance administratrix of said Samuel A. Pomerance, deceased Application October 14, 1946, Serial No. 703,137

15 Claims. (Cl. 135—1)

This invention relates to prefabricated buildings, and more particularly, in the present embodiment of the invention, to an airplane hangar.

While the invention is capable of general adaptation to buildings of different types, the present embodiment of the invention is particularly designed for use as an airplane hangar. As is well known, the ownership and use of private airplanes has materially increased, but some reluctance to purchase planes is due to the fact that the average individual cannot find hangar space or afford to erect a regular hangar to house his plane.

An important object of the present invention is to provide a prefabricated building, and more particularly an airplane hangar, which is so formed of a combination of rigid, resilient and flexible materials as to provide a finished structure the covering material of which is flexible, for example canvas, and which is adequately supported against dead loads, wind pressures, etc.

A further object is to provide a building of the character referred to wherein the flexible covering material is adequately supported by means of flexible elements, such as cables, and which elements in turn are resiliently supported and tensioned so as to support any loads to which the top of the covering material may be subjected, for example loads incident to snow, wind pressures, etc.

A further object is to provide a prefabricated building of the general character referred to having a covering of flexible material so shaped and supported as to take advantage of certain theories of aerodynamics in accordance with which winds of substantial velocity have the effect of reducing the vertical loads on the parts.

A further object is to provide a novel resilient supporting means for the covering material of such character that there is a resilient "give" provided by which heavy and sudden gusts of wind are absorbed without damaging the covering structure or the supporting elements therefor.

A further object is to provide a prefabricated building structure of such character as to render it capable of easy erection on the site by relatively unskilled labor, the various operations required in erection being simple and quickly performed so that substantially no labor costs are involved in the erection of the building.

Other objects and advantages of the invention will become apparent during the course of the following description.

In the drawings I have shown one embodiment of the invention. In this showing

In a general way, the structure comprises a flexible covering indicated as a whole by the numeral 10 and formed of any suitable material, for example canvas. The cover 10 will be more specifically described in detail later. This cover is supported by two cables indicated as a whole respectively by the numerals 11 and 12, and these cables, in turn, are supported in a manner to be described.

The cable 11 is the main supporting cable and in the present instance, this cable extends along four sides in the form of a truncated cone, the longest side being the forward side 14 and the opposite sides 15 converging to the rear or shortest side 16. The shape described is preferred when the structure is to be employed as an airplane hangar, as will become apparent, but it is to be understood that the polygonal form of the cable 11 may be of any desired shape, depending upon the nature of the structure desired and the use to which it is to be put. The apexes of the figure formed by the cable 11 are supported by means described below.

Figure 2:
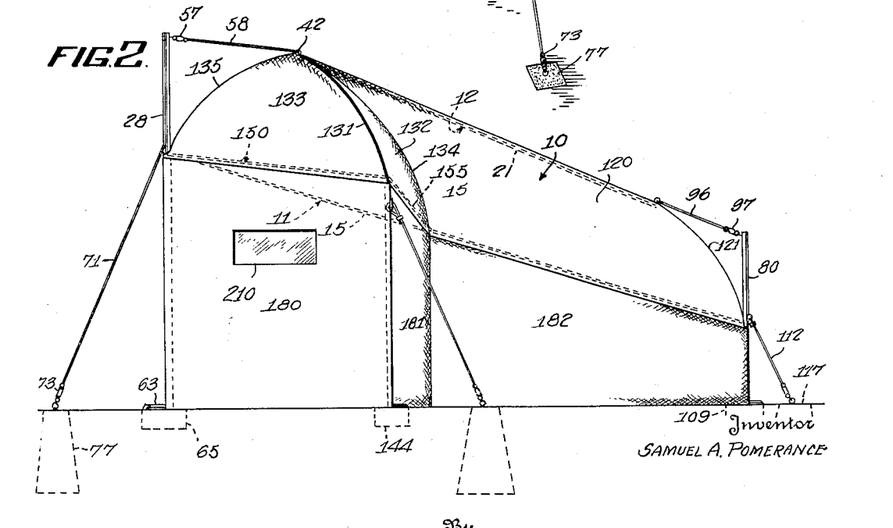
Figure 2 is a side elevation of the same.

The cable 11 may be considered as the main cable and the cable 12 as the auxiliary cable. The cable 12, in the present instance, defines a triangular figure having a forward side 20 parallel to the cable side 14, and rearwardly converging sides 21. The cable sides 21, in plan, are fairly closely parallel to the respective cable sides 15. However, the plane defined by the cable 12 is inclined downwardly and rearwardly as indicated in Figure 2. The portion of the cover 10 supported by the cable 12 is indicated by the numeral 25 and is of triangular shape corresponding to the figure defined by the cable 12. The cover portion 25 defines the top roof portion of the structure and is inclined downwardly and rearwardly, supported by the cable 12, to shed rain, etc.

The cables 11 and 12 are supported by and with respect to a plurality of relatively rigid posts. Referring to Figures 1, 2, 9 and 10, the numeral 28 indicates each of a pair of forward posts as a whole. These posts are identical and only one need be described in detail. Each post 28 may be made up of a pair of vertical angle irons 30 arranged in spaced relation with outstanding flanges 31 lying in a common plane and the other flanges 32 arranged in spaced parallel relation. Between the angle irons of each post 28, at a point spaced from the top thereof, is arranged a pair of spaced plates 33 preferably directly welded to the adjacent faces of the flanges 32 the face 33 being thus rigidly fixed to the angle iron to be effectively supported thereby. A laminated leaf spring 35, having the laminations thereof preferably fixed in proper relation by conventional spring clips 36, is arranged with its flat end remote from the body of the structure arranged between the plates 33. A stop member 37, welded to the flanges 32, limits outward and downward movement of the adjacent end of the spring 35.

A spring clip indicated as a whole by the numeral 40 (Figures 15 and 16) is associated with each spring 35. Each spring clip 40 comprises an upper plate 41 of truncated triangular shape and an upstanding eye 42 is connected to this plate for a purpose to be described. The clip further comprises a transversely extending bottom plate 43 connected to and spaced from the plate 41 by spacers 44 welded to the respective plates 41 and 43. The spacers 44 are inclined toward each other as shown in Figure 15 and provide between the plates 41 and 43 a suitable space for receiving the inner ends of the spring 35 and of a second similar spring 48 to be referred to later.

Figures 9, 10, 11, 16, 17:
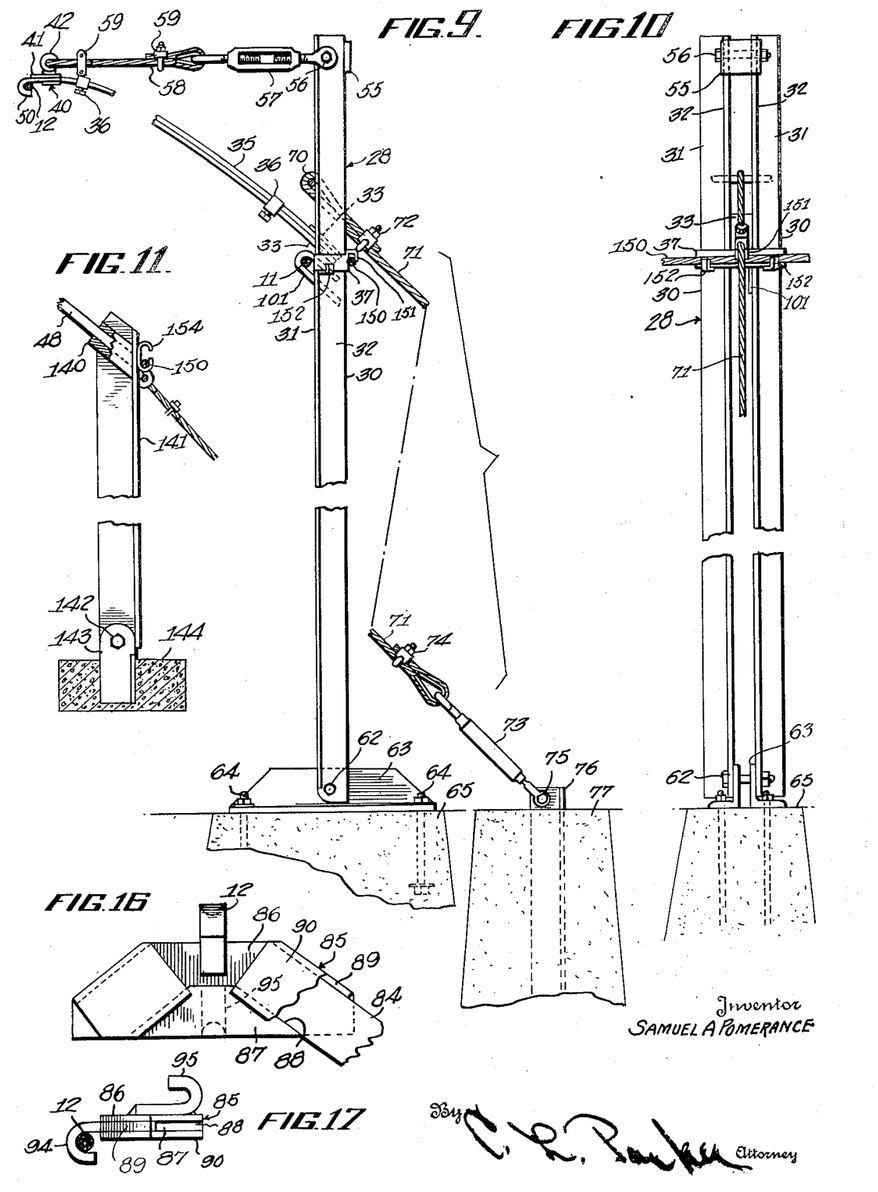
Figure 9 is a side elevation of one of the front supporting posts and associated elements, parts being broken away and parts being omitted, one of the supporting cables for the roof being shown in section.
Figure 10 is a side elevation of the same structure.
Figure 11 is a detail side elevation of one of the auxiliary supporting posts, parts being shown in section and parts being broken away.
Figure 16 is a bottom plan view of the rear spring clip and associated elements.
Figure 17 is a side elevation of same.
Figures 12, 13, 14, 15:
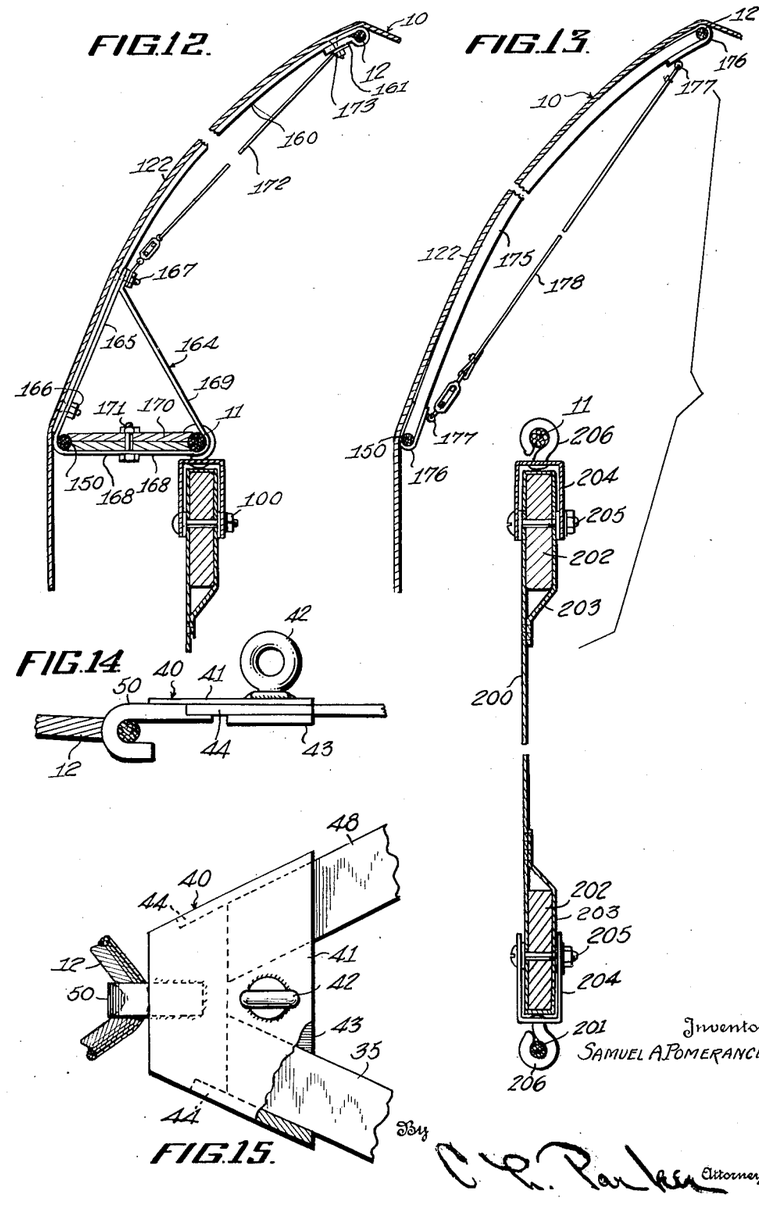
Figure 12 is an enlarged fragmentary detail sectional view on line 12—12 of Figure 3.
Figure 13 is a similar view on line 13—13 of Figure 3.
Figure 14 is a side elevation of one of the forward spring supporting clips, portions of the associated leaf springs and roof supporting cable being shown.
Figure 15 is a plan view of the same.

A hook 50 is welded against the bottom of the plate 41 and engages around the adjacent apex portion of the cable 12, as shown in Figures 9, 14 and 15. It will be apparent that the spring 35 is flexed between its ends and the engagement of the hook 50 with the cable 12 tensions the latter in a horizontal plane as well as to tend to exert an upward force thereon.

The upper ends of the angle irons 30 are braced by a cross member 55 welded to the flanges 32. Adjacent such cross member, a bolt 56 extends through the flanges 32 and this bolt is engaged in the eye of a conventional turnbuckle 57. The other end of this turnbuckle is connected to one end of a tension cable 58, and the other end of this cable is connected to the eye 42 of the spring clip 40. The extremities of the cable 58 are turned back and suitably connected to the body of the cable in any suitable manner, for example by conventional cable clamps 59.

Each of the posts 28 has a suitable support at its lower end to take the compression loads transmitted by the posts, and such supporting means is preferably of the type shown in Figures 9 and 10. The lower ends of the angle irons of each post are pivotally connected by a bolt 62 to angle plates 63. These plates, in turn, are connected by bolts 64 to a compression block 65, preferably of concrete, in which the bolts 64 are embedded. In the erection of the device to be referred to later, a relatively shallow excavation is made for the blocks 65 and the concrete for these blocks is poured with the bolts 64 embedded therein. The structure shown permits the swinging of the posts 28 with respect to the supporting angles 63. This is of minor importance in the first instance for the reason that it permits shipment of the post structure with the supporting angles 63 turned perpendicular to their operative positions. More importantly, the pivoted arrangement of the posts with respect to their supporting means permits some "give" under the influence of horizontal wind pressures against the sides of the structure to be described.

Figure 1:
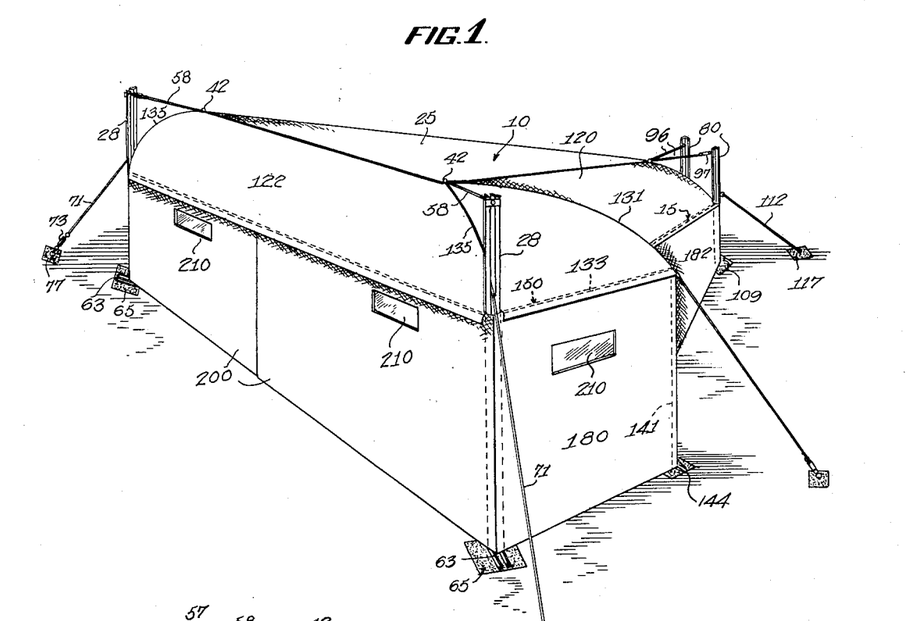
Figure 1 is a perspective view of an airplane hangar constructed in accordance with the invention.

Each of the posts 28 is supported in upright position by the tension means shown generally in Figures 1 and 2 and more specifically in Figure 9. A bar 70 extends across and is welded to the faces of the flanges 31. A tension cable 71 has its end turned around the bar 70 and clamped on the body of the cable by any suitable means such as a conventional cable clamp 72. The opposite end of the cable 71 is connected to the upper end of a turnbuckle 73, a conventional cable clamp 74 again being used to connect the extremity of the cable to the body thereof. The lower end of the turnbuckle 73 is connected by a bolt or other suitable pin 75 to an upstanding bar 76, preferably of angle cross section, deeply embedded in a preferably concrete anchor block 77. Since the cable 71 is under tension, as will become apparent, the block 77 preferably extends substantially deeper into the ground than is true of the compression block 65 previously described.

Figures 5, 6, 7, 8:
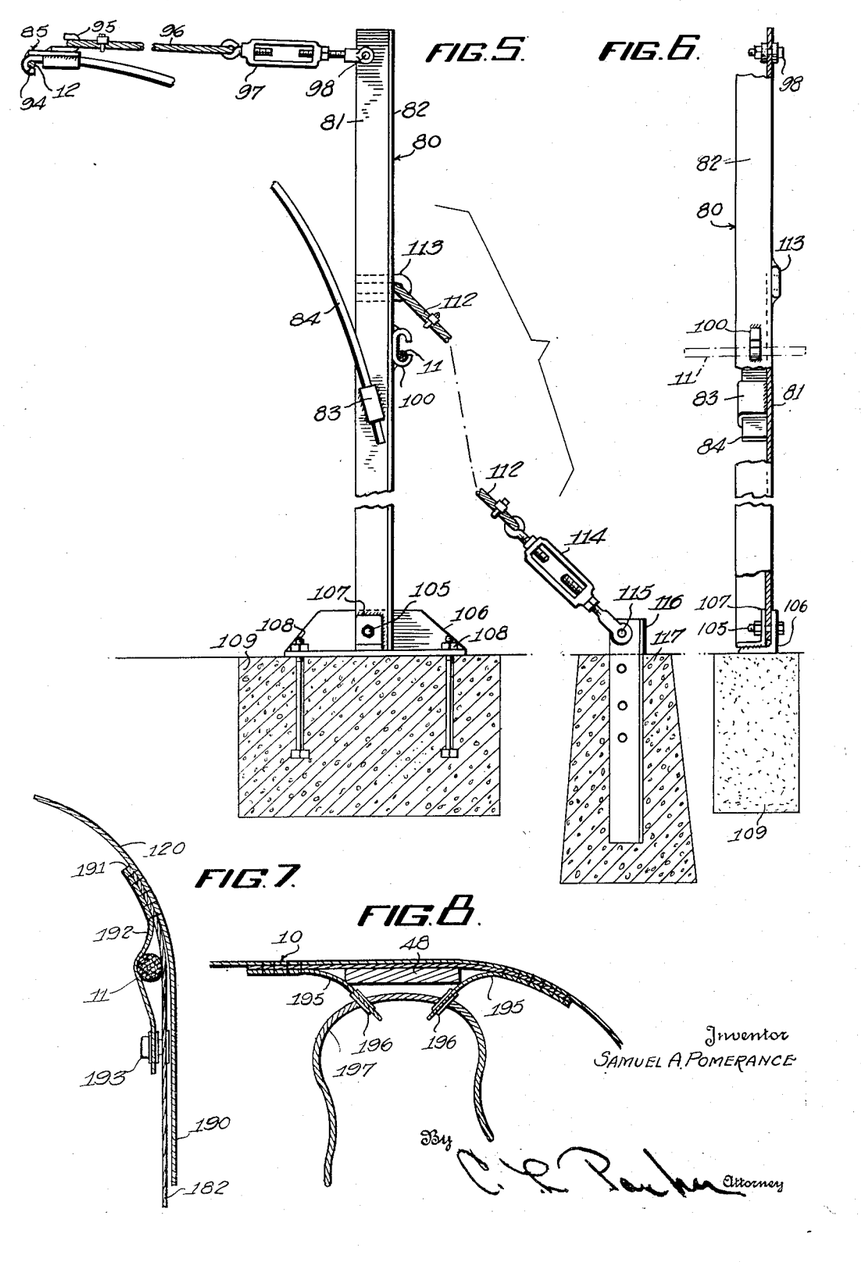
Figure 5 is a generally front elevation of one of the rear supporting posts and the elements associated therewith, the covering material being omitted and parts being broken away.
Figure 6 is a side elevation of the same structure.
Figure 7 is an enlarged fragmentary detail sectional view on line 7—7 of Figure 3.
Figure 8 is a similar view on line 8—8 of Figure 3.

The rear apex portion of the cable 12 and the parts associated therewith to be referred to later are supported by a structure which is generally similar to the post structures and associated elements just described. Referring to Figures 5 and 6, a pair of posts each indicated by the numeral 80 is arranged rearwardly of the building structure at points equidistantly spaced on opposite sides of a center line through the structure from front to rear. These posts and the elements associated therewith are not called upon to carry as much load as the post structures of Figures 9 and 10, for reasons which will become apparent. Where a pair of angle irons is employed for each post 28, each of the posts 80 may be formed as a single angle iron. Such angle iron comprises flanges 81 and 82 the former of which is provided with a socket 83 welded thereto to receive the lower outer end of a spring leaf 84. The other end of the spring 84 is connected to a spring clip indicated as a whole by the numeral 85 (Figures 16 and 17). This spring clip comprises a top plate 86 and a bottom plate 87. The latter plate is in the form of a truncated cone as viewed in Figure 17 and the converging edges 88 thereof are respectively parallel to spacers 89. A plate 90 is welded to each spacer 89 and to the adjacent edge portion of the plate 87. The plate 90 thus cooperates with the plate 86 to form a pair of angularly arranged sockets to receive the upper ends of the springs 84.

The spring clip 85 has a lower hook 94 engaging the adjacent apex portion of the cable 12 as shown in Figures 5 and 17. An upper hook 95 is welded to the top plate 86 and engages one end of a cable 96 in which is arranged a turnbuckle 97. This turnbuckle is connected by a bolt or the like 98 to the flange 81 of the adjacent post 80.

The posts 28 (Figures 9 and 10) and the posts 80 are directly connected to the cable 11 to act as a support therefor. In the case of the posts 80, the cable 11 is engageable within a hook 100 (Figures 5 and 6) arranged outwardly of the posts, the pull on the cable 11 thus transmitting an inward force against each post 80. In the case of the posts 28, the cable 11 extends inwardly of such posts and the use of a hook for supporting the cable 11 is impracticable in view of the very substantial tension under which the cable 11 is maintained. Accordingly, each post 28 is provided with a U-shaped member 101 (Figure 9) through which the cable 11 is threaded, the two arms of the member 101 being welded to the flange 32 of one of the angles 30.

The posts 80 are anchored and supported in the same general manner as the posts 28. The lower end of each post 80 is pivotally connected by a bolt 105 to an angle bracket 106, the bolt 105 also passing through a small inner bracket 107 preferably welded to the base of the bracket 106. The bracket 106 is anchored by means of bolts 108 having their lower ends embedded in a concrete compression block 109.

An anchor cable 112 supports each post 80 in upright position. The upper end of the cable 112 is connected in the loop of a U-shaped member 113 welded on the associated post 80. The lower end of the cable 112 is connected to a turnbuckle 114, and this turnbuckle is connected by a bolt 115 to an anchor member 116 having its lower end portion embedded in a relatively deep preferably concrete anchor block 117.

Figure 3:
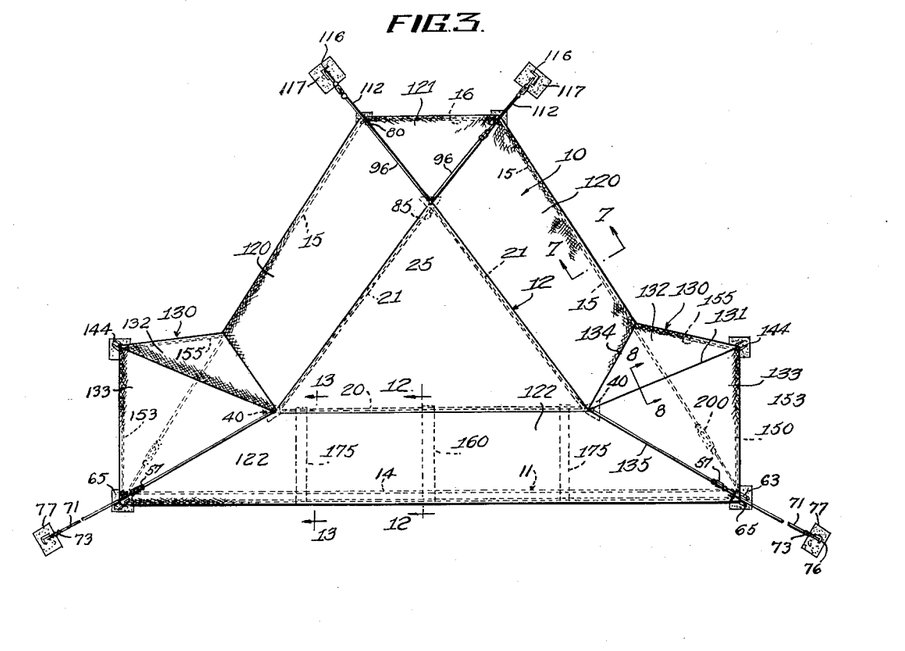
Figure 3 is a plan view of the same.

The foregoing description covers the arrangement and supporting of the main and auxiliary cables 11 and 12 and generally covers the fabric or other flexible covering. In addition to the relatively flat sloping top 25 of the covering, the latter has downwardly curved portions extending between the cables 11 and 12, and between the cable 12 and the supplemental cable at the front of the structure and referred to later. The cover 10 has upper side portions 120 (Figures 1, 2 and 3) which curve outwardly and downwardly between the cable portions 21 and 15 at opposite sides of the structure. At the rear of the structure, there is an outwardly and downwardly curved cover portion 121 extending from the rear apex of the cable 12 and the rear main cable portion 16 (Figures 2 and 3). The line of juncture of the cover portions 120 and 121 are supported in the curved form referred to by the rearwardly diverging springs 84, the cover section 121 being generally triangular with its apex lying substantially coincidental with the apex of the triangle defined by the cable 12. As referred to in greater detail below, the cover further comprises a forward portion 122 which curves forwardly and downwardly from the cable 12.

The present device is particularly designed, as illustrated, to act as an airplane hangar and for this purpose, opposite sides of the front portion are provided with false structures indicated as a whole by the numeral 130. As previously stated, each of the spring clips 40 (Figure 16) affords a connection for the inner end of the associated spring 35 and for the inner end of an additional leaf spring 48, arranged at an angle to the spring 35. The spring 48 extends outwardly and rearwardly to support the cover 10 along a line indicated by the numeral 131 in Figure 3, thus acting as a support for the adjacent portions 132 and 133 of the cover 10 at opposite sides of the structure, the false structure thus provided serving to house the wing tip portions of an airplane. The cover portion 132 joins the cover portion 120 along the line 134, and the cover portion 133 of the false structure joins the forward cover portion 122 along the line 135, the cover along the latter line being supported at each side of the structure by the leaf springs 35 (Figure 9).

The outer end of the spring 48 at each side of the structure is received in a socket 140 carried by the upper end of a post 141 pivotally supported as at 142 to a supporting element 143 embedded in a compression block 144. The strain to which each post 141 is subjected being relatively light, the post 141 and its supporting base 144 likewise may be relatively light in structure and weight.

The outer extremities of the cover portions 132 and 133 at opposite sides of the structure may be supported by a supplemental cable 150. This cable extends across the front of the structure in spaced parallel relation to the cable portion 14 of the cable 11 (Figure 12). The stop member 37 of each post 28 is constructed as shown in Figures 9 and 10, being generally arcuate in shape and extending around the angles 30 of each post 28. An upper downwardly extending central finger 151 is carried by the stop 137, and adjacent opposite ends of this stop are arranged upturned fingers 152. The cable 150 extends around each stop 137 above the fingers 152, and then extends rearwardly at opposite sides of the building structure as at 153 (Figure 3). The cable 150 then extends through a hook 154 (Figure 11) carried by each post 141, then extends inwardly and rearwardly as at 155 (Figure 3). The inner extremity of each cable portion 155 is directly connected to the cable portions 15 of the main cable 11.

All of the upper side portions of the cover 10, namely, the cover portions 120, 121, 122, 132 and 133 are curved outwardly and downwardly and thus form outwardly and downwardly extending projections from the top cover portion 25 to shed water, etc. These downwardly and outwardly curved portions are supported by the various springs 35 (Figure 9), 48 (Figure 11) and 84 (Figure 5), as will be apparent. The substantial expanse of the forward portion 122 of the cover is such that intermediate support is desirable.

Referring to Figures 3 and 12, the numeral 160 designates an arched metallic strap or the like having a suitable clip 161 at its upper end for connecting it to the cable 12 approximately centrally of the width of the portion 20 thereof as shown in Figure 3. The lower end of the member 160 is connected to a triangular strap-like structure 164, one leg 165 of which lies against the member 160 and is bolted thereto as at 166 and 167. The lower arm 168 of the member 164 extends horizontally beneath and transversely of the cables 11 and 150. In this connection, it will be noted that these cables respectively extend around the inside and outside of the forward posts 28 as shown in Figure 9, and accordingly are in spaced relation as they extend across the front of the structure. The lower arm 168 of the member 164 serves as a tie for the cables 11 and 190 intermediate the length of the front of the building to prevent the relative spreading of the cables. The third arm 169 of the member 164 extends upwardly and forwardly and has its free end secured in position by the bolt 167. The cables 11 and 150 are held in proper spaced relation by a spacing device which may comprise a pair of members 170 secured together by a bolt 171 and having their ends engaging the cables referred to. To maintain the bowed shape of the member 160 a suitable cable or other tie 172 is connected between the bolt 67 and the bolt 173 by which the clip 161 is attached to the member 122.

On opposite sides of and spaced from the member 160 a pair of somewhat similar bowed members 175 are arranged. These members may be of wood having yokes 176 at their ends surrounding the cables 12 and 150, as shown in Figure 13. The yokes 176 may be connected to the member 175 by eye bolts 177, and a suitable tie 178 is connected between the eyes of these bolts to maintain the member 175 in its proper bowed shape. The members 160 and 175 cooperate with the springs 35 in maintaining the proper curvature of the cover section 122.

Figure 4:
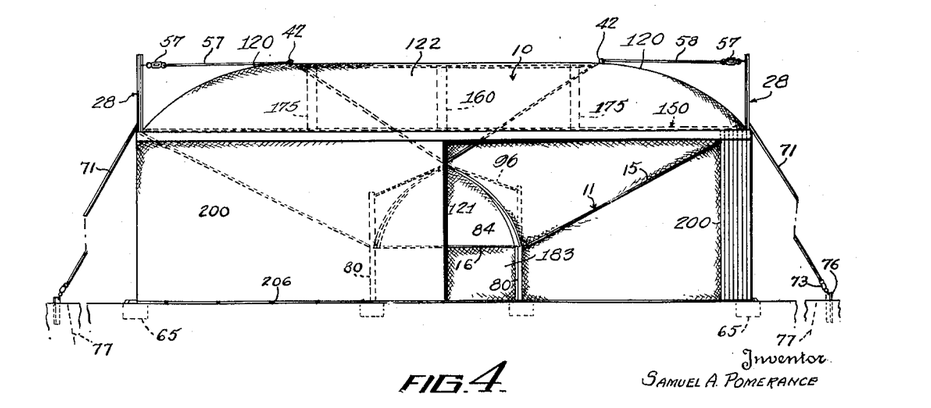
Figure 4 is a front elevation of the same.

The front of the structure is adapted to be closed by doors to be referred to later. Each of the other side and back portions are covered by vertical portions of the cover 10. Referring to Figures 1, 2 and 4, it will be noted that a vertical side portion 180 depends from the cable portion 150 at each side of the structure. Rearwardly of each wall portion 180, there is an inwardly extending vertical wall portion 181 depending from the cover portion 132. Rearwardly of each wall portion 181 there is a vertical wall portion 182 depending from the cover portion 120, and at the rear of the structure, there is a vertical wall portion 183 depending from the cover portion 121. These various vertical wall portions close all sides of the structure except the front, to be referred to later.

Each of the downwardly and outwardly curved cover portions is preferably connected to its associated vertical wall portion and to the main cable 11 as shown in Figure 7. Each section of the downwardly and outwardly curved cover, for example section 120 shown in Figure 7, has a downwardly extending skirt portion 190 overlying the adjacent vertical wall portion, the upper end 191 of which may be suitably connected to the outwardly and downwardly curved cover section in any suitable manner, for example, by stitching. The same stitching, at spaced points, connects a plurality of straps 192 to the cover structure. Each strap extends around the adjacent portion of the cable 11 and is provided at its lower end with a snap fastener or other suitable connecting means 3, for connecting the lower end of each strap to the adjacent vertical wall portion of the cover.

The portion of the cover 10 adjacent each of the springs also may be connected to the latter. For example, either longitudinally extending strips or spaced straps 195 may be connected at one end to the adjacent portions of the cover. The inner edge portions of the elements 195 are provided with eyes 196 for the passage of cords 197, or suitable lacing, whereby the inner portions of the members 195 may be secured around the springs, for example the spring 48 shown in Figure 8.

As a closure for the front of the structure, a pair of canvas or similar door sections 200 may be provided. These door sections may partake of an accordion-like folding action as suggested at the right hand side of Figure 4. Each door is adapted to slide with respect to the front portion 14 of the cable 11 and along a bottom cable 201 (Figure 13) arranged in proximity to the ground surface. Similar means may be provided at the top and bottom of the door for suitably connecting the door to the two cables referred to. Short block sections 202 may be connected along the top and bottom edges, and the door sections are adapted to fold between the blocks 202. Each block 202 may be housed within a fabric extension 203 formed, if desired, as extensions of the material from which the door sections are made. Each block 202 carries a yoke 204 pivotally connected thereto by a bolt 205 and carrying a hook 206 adapted to engage the adjacent cable 11 or 201. In placing the door sections in position, the hooks 206 originally are installed in relatively open shape and are pressed to the relatively closed shape shown in Figure 13 to prevent their disengagement from their respective cables.

The front door sections 200 and any of the vertical wall sections may be provided with windows 210, preferably made of clear plastic.

Operation

In erecting the hangar or other building, the purchaser will lay out on the ground the positions of the several post structures described above, and will suitable excavate the ground for the various concrete blocks to be poured. A number of these blocks will be compression elements, for example, the blocks 65 (Figure 9), 109 (Figure 5) and 144 (Figure 11). Such blocks, being compression elements, do not require substantial depth. The remaining concrete blocks are tension elements and accordingly must be sunk to somewhat greater depths to resist the substantial pull transmitted thereto by the various tension cables which support the posts in upright positions.

Each of the concrete blocks will be poured with the proper connecting element associated therewith, such as the bracket 63 and plate 76 (Figure 9), the corresponding elements 106 and 116 (Figure 5) for the posts 80 and the supporting member 143 (Figure 11). The preparatory work will then be finished and upon the setting of the concrete blocks, the building is ready for erection.

The various spring elements are connected to their respective posts and to their spring clips (40 and 85) and these spring clips, in turn, are connected to the posts by their respective cables while leaving the turnbuckles thereof relatively loose. The hooks 50 (Figures 9, 14 and 15) and 94 (Figures 5, 16 and 17) are then engaged with the cable 12, the cover and associated elements having previously been placed over the various posts.

Prior to engaging the hooks of the spring clips with the cable 12 or immediately thereafter, the posts may be pulled partially to their upright positions. Thereafter, the other cables are connected in position. In this connection, it will be noted that the main cable 11 is threaded through the hooks 100 (Figure 5) and eyes 101 (Figure 9), whereupon the cable 11 is placed within successive straps 192 (Figure 7) and the buttons 193 of such straps snapped in closed position.

The various tensioning cables for the different posts are then tightened by operating the turnbuckles thereof, the posts being gradually brought to their erect position as shown in the drawings. Some little adjustment is required before the parts thus assembled will occupy their final normal positions. As the erect positions of the posts are approached, the turnbuckles 57 and 97 will be tightened, and when the final proper position of the parts is reached, the cable 12 will be stretched taut in the triangular form shown in Figure 3. This cable, and the loads supported thereby, will be supported in turn by the various leaf springs 35, 48 and 84, although the spring 48 exerts little upward force on the cable 12 and is employed primarily to support the back top edge portion 131 of each false structure 130.

With the posts properly positioned, the cable 11 is stretched taut when the posts reach vertical position, and a conventional turnbuckle, as indicated in dotted lines in Figure 3 and indicated by the numeral 200 may be employed for the final tensioning of the main cable. Each tensioning wire of the various posts is provided with a turnbuckle so that these posts can be pulled to their full vertical positions, and the tensioning cables for the posts are arranged in vertical planes determined in accordance with the load transmitted horizontally to the posts so that the tensioning cables pull directly against such loads.

The various flaps 195 are then extended around the several spring members with which they are associated and the strings or laces 197 are tied or laced with respect to the eyelets 196. Since the several springs extend along the top cover edge portions 131 and 135 and at the junctions of the cover portions 120 and 121, it will be apparent that each such edge portion will be securely tied from the tops of the side wall portions to the corners of the triangularly formed cable 12. Accordingly the cover portion 10 will be securely fixed to the supporting means by the strings or laces 197 (Figure 8) and by the straps 192 (Figure 7). While of no importance so far as the present invention is concerned, it will be apparent that any similar securing means (not shown) may be employed for fixing the cover 10 with respect to the cable 12 and with respect to the various posts.

The door structure is placed in position after the erection of the building has been completed in the manner described. The cable 201 (Figure 13) is stretched between the bottom portions of the forward posts 28, whereupon the open hooks 206 at the top and bottom of each door section are engaged with the respective cables 11 and 201. The hooks 206 are then clinched to a sufficient extent around the cables referred to to prevent disengagement of the hooks therefrom.

The door sections 200 are supported from the front section of the cable 11 as shown in Figures 12 and 13. The cable 11 lies inwardly of the cable 150 which defines the forward extremity of the cover section 122. Thus an overhang is provided for the door sections to afford some protection from the weather when the doors are open. In addition, the lower extremity of the cover section 122 may be extended downwardly, if desired, to form a flap to afford additional protection as indicated in Figure 12. The cable 150 is thus utilized to provide the overhang referred to, and this cable also provides the necessary support for the cover sections 132 and 133 (Figure 3) the cable 150 being extended rearwardly as at 153 along the outer extremity of each false section 130, and thence inwardly at 155, the extremity of the cable 150 being secured in any suitable manner to each section 15 of the cable 11.

It will be apparent that the present embodiment of the invention is particularly intended as an airplane hangar and has proved highly efficient in use as well as being economical to manufacture and erect. The door sections 200 fold back to assume open positions approximately as shown at the right hand side of Figure 4, each door section, in fact, being capable of being opened even wider than indicated. Accordingly a plane may be pulled into the hangar, tail first, and the wing tips will be housed within the false sections 130. These sections are wholly open to the interior of the structure, the portion of the section 15 of the cable 11 merely extending through space in each false section 130 and thence through the eyes 101 of the front posts 28. No portion of the cable 11 thus exposed within the hanger is sufficiently low to interfere with the movement of a plane into the hangar.

The spring members have their inward movement limited by the cables connected to the clips thereof, namely, the cables 58 and 96, and the springs are held in their bowed forms by the extension of the cable 12. The spring 48 for the rear portions of the false sections 130 are not provided with the upper cables referred to and these are unnecessary, since in practice these springs are relatively light and are actually called upon only to support the adjacent corner portions of the false sections 130. The cables 58 and 96 limit inward movement of their associated spring clips, but permit outward movement of such spring clips upon the exertion of forces on the structure resulting from wind pressures. Also, the springs are capable of downward deflection within reasonable limits by snow loads, etc., but are sufficiently strong to withstand the heaviest such loads to which the structure may be subjected.

In practice, the structure has been found to adequately withstand wind velocities up to 100 miles per hour. While the various posts are fixed against any inward movement in the planes of their tensioning cables 71 and 112, the posts are capable of limited deflection in other directions. Moreover, the cables 11 and 12 are also capable of deflection under wind pressures, and deflections of the character referred to serve to absorb excessive pressures, for example heavy gusts of wind, after which they return to their proper shapes and positions. Thus damage to the parts by heavy winds is prevented.

The curved cover surfaces extending downwardly and outwardly from the cable 12 act in a manner similar to the upper plane surfaces of an aircraft. In accordance with Bernoulli's theorem, the wind pressure times the velocity of the wind will be a constant, and as is well known in aerodynamics, this fact results in a reduction in the pressure acting downwardly on the curved surfaces referred to. In substantial winds, therefore, an actual lifting of such portions of the cover 10 will occur, the billowing of such cover portions being easily discernible in relatively high winds. Accordingly wind pressure has no depressing effect on the top portions of the cover, thus assisting the structure in withstanding the effects of heavy winds.

While the present embodiment of the invention has been particularly illustrated as an airplane hangar, it will be obvious that the principles involved in the structure readily may be embodied in buildings of any desired type. For example, the false structures 130 need not be employed, and the cable section 16 may be equal in length to the front section of such cable. Thus the outline of the structure would be rectangular, and in forming such structure, the cable 12 would follow a similar profile in shape. In its simplest essence, the invention contemplates the use of upright elements, such as the posts described, for subtending a main flexible supporting element such as a cable, and the use in connection with such upright members of resilient tensioning means for an auxiliary flexible supporting element, such as the cable 12, for the flexible cover employed on the structure. Obviously such essential features of the invention are capable of use with buildings of a variety of shapes, sizes and uses.

I claim:

1. A building comprising a plurality of spaced vertical posts arranged in substantially polygonal form, flexible supporting members extending between said posts, an auxiliary supporting structure arranged above said flexible supporting members and comprising a flexible element bent in substantially polygonal form having sides respectively generally parallel to certain sides of the polygon defined by said posts, separate spring means connecting each post to said auxiliary supporting structure at each corner defined by the polygon thereof, each spring means being tensioned to transmit an upward and outward force to said auxiliary supporting structure at their points of connection therewith, and a cover structure having generally vertical sides extending along certain sides of the polygon defined by said posts, said cover structure further including a roof portion coextensive with the polygon defined by said posts and connected at its edges to said side walls, said top portion extending over and resting upon said auxiliary supporting structure.

2. A building comprising a plurality of spaced vertical posts arranged in substantially polygonal form, flexible supporting members extending between said posts, an auxiliary supporting structure arranged above said flexible supporting members and comprising a flexible element bent in substantially polygonal form having sides respectively generally parallel to certain sides of the polygon defined by said posts, separate spring means connecting each post to said auxiliary supporting structure at each corner defined by the polygon thereof, each spring means being tensioned to transmit an upward and outward force to said auxiliary supporting structure at their points of connection therewith, and a cover structure including side walls extending between adjacent pairs of said posts, said cover structure further comprising a flexible roof portion extending over and engaged by said auxiliary supporting structure.

3. A building comprising a plurality of substantially vertical posts polygonally arranged, a tensioned supporting cable extending between said posts around the polygon defined thereby, an auxiliary cable arranged above the polygon defined by said posts, said auxiliary cable being bent into substantially polygonal form providing corners and sides respectively generally parallel to the sides of the polygon defined by said posts, spring devices connecting each post to one of said corners of said auxiliary cable, each spring device being tensioned to transmit both upward and outward forces to each corner of said auxiliary cable, a flexible cover structure including side walls and a roof portion resting on said auxiliary cable, and a tension device connected to each post and extending outwardly therefrom substantially in the vertical plane of the spring device connected thereto.

4. A building comprising a plurality of substantially vertical posts polygonally arranged, a tensioned supporting cable extending between said posts around the polygon defined thereby, an auxiliary cable arranged above the polygon defined by said posts, said auxiliary cable being bent into substantially polygonal form providing corners and sides respectively generally parallel to the sides of the polygon defined by said posts, spring devices connecting each post to one of said corners of said auxiliary cable, each spring device being tensioned to transmit both upward and outward forces to each corner of said auxiliary cable, a covering structure comprising side walls extending between adjacent pairs of said posts, and a flexible roof portion coextensive with the polygon defined by said posts and resting on said auxiliary cable, and tension means connected to each post at a point spaced from the bottom thereof and extending outwardly and downwardly substantially in the vertical plane of the spring device associated with such post.

5. A building comprising a plurality of substantially vertical posts polygonally arranged, a tensioned supporting cable extending between said posts around the polygon defined thereby, an auxiliary cable arranged above the polygon defined by said posts, said auxiliary cable being bent into substantially polygonal form providing corners and sides respectively generally parallel to the sides of the polygon defined by said posts, spring devices connecting each post to one of said corners of said auxiliary cable, each spring device being tensioned to transmit both upward and outward forces to each corner of said auxiliary cable, a covering structure of flexible material including side walls extending between adjacent pairs of said posts, and a roof portion coextensive with the polygon defined by said posts and resting on said auxiliary cable, and a tension cable connected to each post at a point spaced from the lower end thereof and extending outwardly and downwardly therefrom with its lower end anchored, each tension cable lying substantially in the vertical plane of the spring device connected to the associated post.

6. A building comprising a pair of spaced forward posts and a pair of spaced rear posts, a tensioned main cable extending around said posts and lying in a plane inclined downwardly and rearwardly from said forward posts, means for limiting inward movement of said posts under the influence of the tension of said cable, a flexible covering structure comprising side walls extending between adjacent pairs of said posts and fixed at their upper ends with respect to said main cable, and a roof portion extending over said main cable, an auxiliary cable bent into substantially polygonal form to provide corners and sides respectively generally parallel to the sides of said main cable extending between adjacent pairs of said posts, and a leaf spring device having one end anchored with respect to each post and having its other end connected to said auxiliary cable at one of said corners thereof, each of said leaf spring devices being bowed under tension to transmit an upward and outward force to each corner of said auxiliary cable.

7. A building comprising a pair of spaced forward posts and a pair of spaced rear posts, a tensioned main cable extending around said posts and lying in a plane inclined downwardly and rearwardly from said forward posts, means for limiting inward movement of said posts under the influence of the tension of said cable, a flexible covering structure comprising side walls extending between adjacent pairs of said posts and fixed at their upper ends with respect to said main cable, and a roof portion extending over said main cable, an auxiliary cable bent into substantially polygonal form to provide corners and sides respectively generally parallel to the sides of said main cable extending between adjacent pairs of said posts, a spring socket carried by each post, leaf springs each having one end arranged in each socket and having its other end connected to one corner of said auxiliary cable, each spring socket being so arranged with respect to the point of connection of the corresponding spring with said auxiliary cable as to maintain each spring under tension to transmit an upward and outward force to said auxiliary cable.

8. A building comprising a pair of spaced front posts and a pair of spaced rear posts, a main cable extending around said posts under tension, means for bracing each post against the tension exerted thereon by said main cable, an auxiliary cable arranged higher than said main cable, means resiliently connecting said auxiliary cable to said posts, a fabric cover structure comprising side walls extending between each front post and the corresponding rear post, a rear wall extending between said rear posts, and a roof structure coextensive with said main cable and connected to the sides thereof between said posts, and a door structure supported by the side of said main cable extending between said front posts.

9. A building comprising forward and rear posts arranged in substantially polygonal form, a main cable extending around said posts under tension and lying in a plane sloping downwardly and rearwardly from said front posts, guy cables connected to the respective posts at points spaced from the lower ends thereof, an auxiliary cable bent into substantially polygonal shape forming corners and sides the latter of which are respectively generally parallel to the portions of said main cable extending between certain of said posts, a spring clip engaging each corner of said auxiliary cable, a leaf spring connected between each post and one of said spring clips to transmit an upward and outward force to each corner of said auxiliary cable, tensioning cables connecting each post to one of said spring clips, and a cover structure including side walls extending between adjacent pairs of said posts, and a roof portion fixed at its edges with respect to said main cable and resting on said auxiliary cable.

10. A building comprising forward and rear posts arranged in substantially polygonal form, a main cable extending around said posts under tension and lying in a plane sloping downwardly and rearwardly from said front posts, guy cables connected to the respective posts at points spaced from the lower ends thereof, an auxiliary cable bent into substantially polygonal shape forming corners and sides the latter of which are respectively generally parallel to the portions of said main cable extending between certain of said posts, a spring clip engaging each corner of said auxiliary cable, a leaf spring connected between each post and one of said spring clips to transmit an upward and outward force to each corner of said auxiliary cable, tensioning cables connecting each post to one of said spring clips, and a flexible cover structure comprising side walls extending between adjacent pairs of said posts, and a roof portion fixed at its edges with respect to the sides of said main cable and resting on said auxiliary cable, the polygon defined by said auxiliary cable being smaller than the polygon defined by said posts, and the portions of said roof portion between said main and auxiliary cables being subtended by said leaf springs.

11. An airplane hangar comprising a pair of spaced vertical front posts, a pair of back posts spaced apart a distance less than the space between said front posts and lying in a plane parallel to the vertical plane of said front posts whereby said posts define a substantially truncated triangular figure, a tensioned cable extending across said front posts, thence rearwardly and downwardly between said front and rear posts, and then horizontally between said rear posts at a level spaced from the lower ends of the latter whereby said main cable lies in a plane sloping downwardly and rearwardly from said front posts, an auxiliary cable bent into substantially triangular form above and in a plane substantially parallel to said plane of said main cable, a pair of auxiliary posts arranged rearwardly of each front post to define with respect to said truncated triangle oppositely extended wing portions to receive the wing tips of an airplane, means for supporting said auxiliary cable from a plurality of said posts to tension it in its said plane and to transmit an upward force to each corner of said auxiliary cable, and a cover structure comprising a plurality of vertical walls extending between said front and auxiliary posts, thence inwardly to the adjacent sides of said main cable, thence rearwardly along the latter to said rear posts and thence across said rear posts, and a roof portion fixed at its edges to each of said side walls and resting on said auxiliary cable.

12. An airplane hangar comprising a pair of spaced vertical front posts, a pair of back posts spaced apart a distance less than the space between said front posts and lying in a plane parallel to the vertical plane of said front posts whereby said posts define a substantially truncated triangular figure, a tensioned cable extending across said front posts, thence rearwardly and downwardly between said front and rear posts, and then horizontally between said rear posts at a level spaced from the lower ends of the latter whereby said main cable lies in a plane sloping downwardly and rearwardly from said front posts, an auxiliary cable bent into substantially triangular form above and in a plane substantially parallel to said plane of said main cable, a pair of auxiliary posts arranged rearwardly of each front post to define with respect to said truncated triangle oppositely extended wing portions to receive the wing tips of an airplane, means for supporting said auxiliary cable from a plurality of said posts to tension it in its said plane and to transmit an upward force to each corner of said auxiliary cable, and a flexible cover structure comprising side walls extending between said front and auxiliary posts, thence inwardly from said auxiliary posts to the adjacent sides of said main cable, thence rearwardly along the latter to said back posts and thence across said back posts, and a roof portion corresponding in shape to the figure defined by said side walls and connected at its edges thereto, said roof portion extending over and engaging said auxiliary cable.

13. An airplane hangar comprising a pair of spaced vertical front posts, a pair of back posts spaced apart a distance less than the space between said front posts and lying in a plane parallel to the vertical plane of said front posts whereby said posts define a substantially truncated triangular figure, a tensioned cable extending across said front posts, thence rearwardly and downwardly between said front and rear posts, and then horizontally between said rear posts at a level spaced from the lower ends of the latter whereby said main cable lies in a plane sloping downwardly and rearwardly from said front posts, an auxiliary cable bent into substantially triangular form above and in a plane substantially parallel to said plane of said main cable, a pair of auxiliary posts arranged rearwardly of each front post to define with respect to said truncated triangle oppositely extended wing portions to receive the wing tips of an airplane, means for supporting said auxiliary cable from a plurality of said posts to tension it in its said plane and to transmit an upward force to each corner of said auxiliary cable, a supplemental cable connected to each front post and extending rearwardly to each auxiliary post and thence inwardly and connected to the adjacent side of said main cable, and a flexible covering structure including side walls extending between said front and auxiliary posts and then inwardly to said main cable and supported by said supplemental cable, thence rearwardly along the adjacent portions of said main cable and supported thereby, and thence across said back posts and supported by the main cable portion therebetween, and a roof portion corresponding in shape to the figure defined by said side walls and extending over and supported by said auxiliary cable.

14. A building comprising a main supporting structure including generally polygonally arranged posts, a flexible auxiliary supporting structure arranged above said main supporting structure and having sides respectively generally parallel to certain of the sides of the polygon defined by said posts, each side of said auxiliary supporting structure lying relatively inwardly of the corresponding side of the polygon defined by said posts whereby the area of the polygon defined by said auxiliary supporting structure is substantially smaller than the polygon defined by said posts, springs each having one end thereof fixed with respect to each of said posts, each spring extending upwardly and inwardly and being flexed downwardly and inwardly for connection with a corner portion of said auxiliary supporting structure whereby it exerts a resilient force upwardly and outwardly thereon, and a cover structure at least co-extensive in area with the polygon defined by said posts and extending over and covering said auxiliary supporting structure.

15. A building comprising a main supporting structure including generally polygonally arranged posts, a flexible auxiliary supporting structure arranged above said main supporting structure and having sides respectively generally parallel to certain of the sides of the polygon defined by said posts, each side of said auxiliary supporting structure lying relatively inwardly of the corresponding side of the polygon defined by said posts whereby the area of the polygon defined by said auxiliary supporting structure is substantially smaller than the polygon defined by said posts, springs each having one end thereof fixed with respect to each of said posts, each spring extending upwardly and inwardly and being flexed downwardly and inwardly for connection with a corner portion of said auxiliary supporting structure whereby it exerts a resilient force upwardly and outwardly thereon, and a roof comprising a cover co-extensive with the polygon defined by said auxiliary supporting structure and resting thereon, and side portions extending downwardly and outwardly and supported by said springs.

SAMUEL A. POMERANCE.

REFERENCES CITED

The following references are of record in the file of this patent:

UNITED STATES PATENTS

| Number | Name | Date |
|---|---|---|
| 1,481,019 | Luebbert | Jan. 15, 1924 |

FOREIGN PATENTS

| Number | Country | Date |
|---|---|---|
| 429,891 | France | July 29, 1911 |